April 19, 1966 W. EICHLER ETAL 3,247,017
MAGNETIC RECORDING TAPE FOR SOUND, IMAGE AND PULSE RECORDING
Filed Dec. 27, 1961
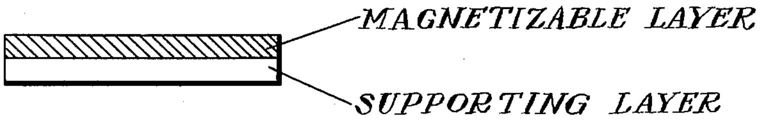
INVENTORS
WOLFGANG EICHLER
WILHELM ABECK
WOLFGANG JOSTEN
FRIEDRICH KRONES
BY Connolly and Hutz
ATTORNEYS // United States Patent Office 3,247,017

Patented Apr. 19, 1966

3,247,017

MAGNETIC RECORDING TAPE FOR SOUND, IMAGE AND PULSE RECORDING

Wolfgang Eichler, Leverkusen, Wilhelm Abeck, Cologne-Stammheim, Wolfgang Josten, Krefeld-Uerdingen, and Friedrich Krones, Leverkusen, all of Germany, assignors to Agfa Aktiengesellschaft, Leverkusen, Germany, a corporation of Germany Filed Dec. 27, 1961, Ser. No. 162,564
Claims priority, application Germany, Jan. 3, 1961, A 36,423
3 Claims. (Cl. 117—138.8)

This invention relates to a magnetic recording tape comprising a magnetizable layer which consists of a film-forming organic synthetic binding agent and particles of ferromagnetic material dispersed therein, as well as a process for the production of said magnetic recording tape.

The quality of a magnetic recording tape for the purpose of storing information in the electrical communication art is substantially determined by the properties of the magnetizable layer. The degree of distribution of the iron oxide in the magnetizable layer and, as a consequence thereof, the packing density of the iron oxide, defined as a volume filling factor (amount of the magnetic pigment per unit of volume), and the surface quality of the layer are of decisive importance in determining the value of the magnetic recording tape from the point of view of its sensitivity characteristics, noise level, and frequency response curve.

The magnetizable layer of magnetic recording tapes generally employed at the present time for the recording of sound, images and pulses consists of iron oxide and a resinous binder which is capable of adhering to the support. Plastics of high molecular weight, i.e., thermoplastic resins from various classes of chemical compounds have hitherto predominantly been used for the production of the magnetizable layer either alone or in admixture with each other. Recent fields of application for magnetic recording tapes, for example, magnetic image recording, storage drums in data-processing machines, magnetic machine control, endless tapes in recorded-announcement apparatus and noise recorders and the like, place considerably greater demands on the mechanical and thermal stability of the magnetizable layer than was formerly the case. Layers of most of the thermoplastic resins were not equal to these high standards, on account of their low resistance to abrasion and their relatively low softening point. On the other hand, polyurethane reaction resins prepared from polyesters containing hydroxyl groups and isocyanate (polyaddition resins) are excellently suitable for extreme stresses in the magnetizable layer on account of their great layer hardness and high elasticity, their outstanding resistance to abrasion, their good adhesion and their very high softening point (above 200° C.). The addition reaction of the resin components of low molecular weight only takes place after casting onto the non-magnetic support. The dispersing of the pigments is generally accomplished in a solution of one of the two components of low molecular weight. Dispersion of the pigment is frequently rendered very difficult in such a system. Primarily superficial forces impede a perfect distribution of the pigment in these systems. In addition, in a mixture of iron oxide and a lower molecular weight resin component of a polyaddition resin it is not possible to transmit during the grinding process any strong shear stresses which are of major importance for a good dispersion of the pigments, especially when kneader mixers or apparatuses that involve a similar principle of mixing are used for the dispersing operation.

The magnetizable layers produced from these resinous binders, which are perfect from the point of view of their mechanical and thermal properties, are frequently inferior to layers of thermoplastic resins from the point of view of the packing of the iron oxide (density of iron oxide per unit of volume) and the surface smoothness.

It has now been found that magnetizable layers with an excellent degree of dispersion of the magnetic metal oxide, a high packing density and outstanding surface smoothness are obtained by using as binding agent for the magnetizable layer a polyurethane reaction resin in admixture with a highly polymeric, thermoplastic resinous binder, which binder is soluble in the solvent suitable for the components of the polyurethane reaction resin and forms a good, firmly adhering film with the said resin. A cross-section of the magnetic recording tapes that are referred to in the present specification is illustrated in the accompanying drawing.

By the terms polyurethane resins and polyurethane reaction resins as used herein are to be understood reaction or condensation products of a polyester containing free hydroxyl radicals, and an isocyanate. Such polyurethanes are described, for example, in British Patent No. 547,672, German Patent No. 814,225 and in the article by Otto Bayer that appeared in Modern Plastics, vol. 24, No. 10, pages 149–152, 250, 252, 254, 256, 258, 260, and 262 (June 1947). Suitable polyesters which contain free hydroxyl radicals are obtained by reaction of polycarboxylic organic acids, especially dicarboxylic acids, such as adipic and phthalic acids with polyhydric alcohols, of which at least a portion are trihydric alcohols. An excess of the alcoholic component is necessary, in order to obtain polyesters with free hydroxyl radicals. These polyesters are reacted with diisocyanates such as hexamethylene diisocyanate, tolylene diisocyanate, toluene-2,4-diisocyanate, and or higher functional isocyanates such as triphenyl methane triisocyanate or the reaction product of a diisocyanate with a trihydric alcohol such as glycerol, hexanetriol, trimethylol propane or mixtures of trihydric alcohols. For the purpose of the present invention the preferred amount of the polyurethane resin component is between 75 and 95%.

By the term physically drying resins as used herein, are to be understood soluble, non-cross-linked polymers which belong generally to the group of polymers known as thermoplastics. The term "thermoplastics," as used herein, can be defined as resins which can be softened or dissolved repeatedly in organic solvents and hardened by evaporation of the solvents as distinguished from resins which dry or harden by oxidation, polymerization or other chemical reaction. The term is applied to those resins which, upon dissolving and evaporation of the solvent undergo only physical and not chemical change. Such products are for example; (1) polymers and copolymers of acrylic and methacrylic acids and their derivatives such as (a) esters obtained from aliphatic alcohols having up to 5 carbon atoms, also (b) nitriles, and (c) amides thereof; (2) polymers and copolymers of vinyl compounds such as vinyl chloride, vinyl esters of aliphatic carboxylic acids having up to 5 carbon atoms, vinyl ethers having up to 8 carbon atoms, and vinylidene chloride; (3) chlorinated polyvinyl chloride; (4) copolymers of vinyl derivatives with maleic acid; (5) blends of polyvinyl resins with copolymeric butadiene-acrylonitrile rubbers (which are referred to simply as "nitrile rubbers"); (6) plasticized cellulose ethers or esters such as cellulose nitrate; and (7) copolymers of vinyl chloride with acrylic acid esters.

It is of major importance that the characteristic properties of the polyurethane reaction resin, such as high resistance to abrasion, high elasticity, good layer bonding and higher thermal stability, are not impaired by the addition of the highly polymeric resin binder, but are fully maintained, whereas on the other hand all advantages of the highly polymeric resin binder become effective, so that in particular a good dispersion effect and higher viscosity for the transmission of the shear stresses results.

The polymeric thermoplastic resinous binder is added to that component of the polyurethane reaction resin in which the grinding of the pulverulent magnetizable substance is effected. It is particularly advantageous if first of all the highly polymeric thermoplastic binding agents in dissolved or solid form are caused to act alone on the magnetizable metal oxide and the components of the polyurethane reaction resin are only added subsequently. A dry grinding of the metal oxide with the powdered highly polymeric thermoplastic binder, carried out prior to the wet grinding, has proved to be very satisfactory since the surface of the metal oxide is charged by adsorption with said binding agent and the dispersion is in this way considerably facilitated and accelerated.

In the processing of such a metal oxide-resin binder mixture in kneader mixers or similar apparatuses, if desired with the addition of very small quantities of solvent, a viscous, plastic composition is first of all prepared in which excellent dispersion and high packing of the mixture is produced in as short a time as possible under the action of strong shearing forces. If required, these kneaded mixtures can be rolled out as sheets on calendering machines, thus improving still further the dispersion of the iron oxide and the packing of the mixture. The viscous plastic compositions thus obtained are dissolved and subjected to grinding for a short period in a conventional grinding apparatus such as a ball mill or a vibrating mill.

The grinding may equally well be carried out however in ball mills or vibrating mills without prior use of a kneader but a correspondingly longer grinding period then becomes necessary.

The magnetizable layer made according to the invention has, in addition to the advantages hereinbefore described, also the advantage that a magnetic orientation of the iron oxide particles, which frequently could not be achieved at all or only very incompletely when polyurethane resins were used as sole binding agent for the magnetizable layers, is possible. The magnetic orientation can be effected in known manner by conducting an iron oxide binder mixture, cast on the unmagnetized support, through a magnetic field of suitable field intensity, prior to the initial drying. In polyurethane lacquers, the interactional forces between the components of the system, comprising magnetizable particles and binding agent, are stronger than the directing forces of the magnetic field, thus preventing orientation of the magnetic particles. Due to the presence of small quantities of a suitable highly polymeric physically drying binder, for example, polyvinyl derivatives, the magnetic orientation can be carried out without difficulty, especially when the highly polymeric physically drying binder first of all acts by itself on the iron oxide and has superficially saturated the latter by absorption. With regard to the magnetic field the small iron oxide particle now behaves as if it were only dispersed in the highly polymeric physically drying binder which has been added.

*Example 1*

2500 g. of $\gamma$-ferric oxide of cubic crystal form (edge length of the primary particles about 0.1 micron), the saturation remanence of which is $B_R/\rho=650$ gausses cm.$^3$. g.$^{-1}$ and the coercivity of which is about 310 oersteds; 226 g. of a polyester derived from 3 mols of adipic acid, 2 mols of 1,3-butylene glycol (1,3-butane-diol) and 2 mols of hexanetriol; 132 g. of a copolymer of polyvinyl chloride and polyvinyl acetate (prepared by copolymerization in conventional manner of 85 parts of vinyl chloride with 15 parts of vinyl acetate), corresponding to 16 percent by volume of the total resin and 24 g. of benzyl butyl phthalate and 300 g. of cyclohexanone are introduced into a kneader mixer and treated for about 2 hours. A viscous, plastic composition results. The kneaded composition is formed into a paste in the kneader by slow addition of 2 liters of a mixture of ethyl acetate and chlorobenzene (1:1) and removed therefrom as soon as it is homogeneous. After adding another 3.16 liters of ethyl acetate-chlorobenzene mixture, the composition is ground for 24 hours in a ball mill. 328 g. of hexamethylene diisocyanate which is partially reacted with hexanetriol, and if desired further solvent, are added to the iron-oxide-resin suspension and this is cast onto a polyester foil (based on terephthalic acid and ethylene glycol) having a thickness of 20 microns, to give an iron oxide coating of either (*a*) 13 g./m.$^2$ or (*b*) 50 g./m.$^2$.

With a layer thickness of $(a)=6.3$ microns and $(b)=22.8$ microns, one can calculate a space factor for the layer (*a*) of 44 percent and for the layer (*b*) of 46.6 percent assuming the density of the iron oxide to be 5 g./cm.$^3$.

Using an iron oxide-resin suspension, which contains all the previously described components, with the exception of the polyvinyl derivative, an iron oxide coating of (*c*) 13 g./m.$^2$ produces a layer thickness of 8.6 microns and an iron oxide coating of (*d*) 50 g./m.$^2$, a layer thickness of 33 microns corresponding to a space factor for (*c*) and (*d*) of about 32 percent.

With equal mechanical quality, the layers (*a*) and (*b*) are distinguished from the layers (*c*) and (*d*) by a considerably greater surface smoothness. As regards electroacoustic properties, the layers (*a*) and (*b*) are far superior to the layers (*c*) and (*d*).

The modulability (maximum band flux) of the layers (*a*) and (*c*) at 10 kilohertzes or kilocycles per second (kc./sec.) and 9.5 cm./sec. speed of the tape (corresponding to $\lambda=10$ microns) were compared. If the modulability for (*c*) is given the value 1, then (*a*) has a value of 3.

A comparison of the layers (*b*) and (*d*) at 1 kc./sec. and 38 cm./sec. (corresponding to $\lambda=380$ microns, assuming the modulability for (*d*) to be 1, gives a value of 2 for the modulability of (*b*).

At 10 kc./sec. and 38 cm./sec. speed of the tape ($\lambda=38$ microns) and with a modulability of 1 for (*d*), the value for (*b*) is 1.6. The response curve of the layer (*a*) exceeds that of the layer (*c*) $V=9.5$ cm./sec. by 6 db, that is, by a factor of 2.

The layer according to the invention is not only distinguished by superior electroacoustic properties, but also by an extraordinarily high mechanical and thermal stability which are not inferior to those of a layer consisting of a pure polyurethane resin. The layer remains practically unchanged, even after having been run for a million times on a conventional magnetic sound instrument. On account of its excellent surface smoothness, it has outstanding antifriction properties and only causes a minimum amount of abrasion on the magnetic head.

*Example 2*

8 kg. of acicular $\gamma$-ferric oxide (particle length of about 0.8 micron, particle width about 0.1 micron) with a saturation remanence $B_R/\rho$ of 20 gausses$\times$cm.$^3$.g.$^{-1}$ and a coercivity $I_{HC}$ of 270 oersteds, are introduced into a solution of 921 g. of polyester consisting of the product of the condensation of 3 mols of adipic acid, 2 mols of 1,3-butylene glycol and 2 mols of hexanetriol, and 590 g. of a copolymer of polyvinyl chloride and polyvinyl acetate as described in Example 1 (corresponding to 20 percent by volume of the total resin) in 10.25 liters of ethyl acetate, 10.25 liters of chlorobenzene and 1.6 liters of cyclohexanone, and ground for 8 hours in a ball mill.

1230 g. of hexamethylene diisocyanate which is partially reacted with hexanetriol are added to the iron oxide resin suspension thus obtained and is cast onto a polyester foil (based on terephthalic acid and ethylene glycol) in a thickness of 25 microns.

The thickness of the dry layer is 14 microns with an iron oxide content of 27 g./m.$^2$. The calculated space factor is thus 39.6 percent. The layer has a smooth surface, is resistant to scratching and abrasion and adheres firmly to the polyester support.

A layer prepared under the same conditions but without addition of the highly polymeric polyvinyl derivative and with an $Fe_2O_3$-content likewise of 27 g./m.$^2$, has a layer thickness of 17 microns, corresponding to a space factor of 31 percent. A comparison of the electroacoustic properties (measured at $V$=38 cm./sec. in the optimum case) produces for the layer with the addition of the high polymer a sensitivity which is higher by 3 db, a frequency response curve which is better by 3 db, a correction of non-linear harmonic distortion which is better by 6 db and an operational volume range which is greater by 5 db.

Under the action of homogeneous magnetic field with a field intensity of about 1000 oersteds on the iron oxide-resin suspension applied to the polyester foil, a relative increase in remanence in the direction of travel of the tape of 40 percent was produced with the layer to which the polyvinyl derivative had been added, whereas a relative increase in remanence of only 5 percent is produced with the layer to which the high polymer has not been added.

*Example 3*

22.4 kg. of acicular $\gamma$-ferric oxide having the properties described in Example 2 are ground for 48 hours in a ball mill in a solution of 830 g. of a copolymer based on polyvinyl isobutyl ether (corresponding to 10 percent by volume of the total resin) in 25.7 liters of chlorobenzene and 4.48 liters of cyclohexanone. A solution of 2.91 kg. of polyester derived from 3 mols of adipic acid, 2 mols of 1,3-buylene glycol and 2 mols hexanetriol in 3 liters of ethyl acetate and 3 liters of chlorobenzene is then added and the grinding is continued for another 8 hours.

A solution of 3.89 kg. of hexamethylene diisocyanate, which is partially reacted with hexanetriol, is added to the iron oxide-resin suspension thus obtained and the mixture is cast onto an acetyl cellulose foil with a thickness of 130 microns, so that the layer contains 25 g. of $\gamma$-ferric oxide per square meter. The layer thickness is 13.5 microns corresponding to a space factor of 37 percent. The layer has a smooth surface, is resistant to abrasion and scratching, adheres satisfactorily to the support and is distinguished from a layer prepared under otherwise the same conditions but without any addition of the polyvinyl derivative by substantially higher smoothness, a space factor higher by 6 percent and considerably better electroacoustic properties.

Comparative measurement of the layers with and without addition of the high molecular weight polymer on 16 mm. magnetic film (measurement at $V$=19.05 cm./sec., working point 20 percent above the optimum biasing current) showed in respect of the layer according to the invention a sensitivity higher by 2 db, a frequency response curve better by 4 db and a correction of non-linear harmonic distortion better by 3 db.

*Example 4*

2500 g. of cubic iron oxide with the physical properties as described in Example 1 are intimately mixed with 165 g. of powdered copolymer based on vinyl chloride and acetate according to Example 1 and ground for 48 hours in a ball mill, using 12 mm. steel balls. After this time, there is obtained a pigment-plastic mixture with microscopic homogeneity.

226 g. of polyester derived from 3 mols of adipic acid, 2 mols of 1,3-butylene glycol and 2 mols of hexanetriol, 300 g. of cyclohexanone, 2.74 liters of ethyl acetate and 2.74 liters of chlorobenzene are added to this mixture and the grinding is continued for another 40 hours. After adding 328 g. of hexamethylene diisocyanate to the iron oxide-resin suspension, the latter is cast onto a triacetate foil with a thickness of 40 microns, so that the pigment coating is 25 g. per square meter. The dry layer has a thickness of 13 microns, corresponding to a space factor of 38.6 percent. It is distinguished by an excellent surface smoothness, is resistant to abrasion and adheres firmly to the support.

A layer-like magnetic storage means prepared under identical conditions but without addition of the high polymer polyvinyl derivative, and with an iron oxide coating of 25 g. per square meter has a layer thickness of 16 microns, corresponding to a space factor of only 31.2 microns.

A comparison of the electroacoustic properties (measurement at $V$=38 cm./sec. speed of the magnetic tape) shows for the magnetic recording tape according to the invention a sensitivity which is higher by 1.5 db, a frequency response curve better by 3.5 db. and a correction of non-linear harmonic distortion better by 5 db.

It will be clear to those skilled in the art that the practice of our invention lends itself readily to a number of useful modifications in method, apparatus and materials, for example the support of the magnetic recording tape according to the invention is not limited to the previously mentioned because the support may consist of suitable high polymeric organic compounds such as polyesters on the basis of terephthalic acid and ethylene glycol, polycarbonates especially on the basis of bis-phenylol alkanes, polystyrene, polyvinyl chloride, cellulose esters and others. The polymeric product used as a support may be stretched or not.

Our invention is to be considered as limited only by the scope of the appended claims.

What is claimed is:

1. A magnetic recording tape comprising
   (a) a supporting layer formed of a highly polymeric organic material having coated thereon
   (b) at least one magnetizable layer formed of an organic nonmagnetic film-forming binding agent throughout which ferromagnetic particles are dispersed in an amount between 30 and 50 percent by volume based on the total volume of magnetizable layer, the said binding agent consisting essentially of a mixture of
      (i) between 75–95% of a polyurethane resin produced by reaction of a polyester containing free hydroxyl radicals with a polyisocyanate, and
      (ii) between 5–25% of a thermoplastic non-cross-linked polymeric resin selected from the group consisting of copolymers of vinyl chloride and vinyl acetate, and polyvinyl isobutyl ethers.

2. A magnetic recording tape as defined in claim 1 in which the binding agent consists essentially of a polyurethane resin and a copolymer of vinyl acetate and vinyl chloride.

3. A magnetic recording tape as defined in claim 1 in which the binding agent consists essentially of a polyurethane resin and a polyvinyl isobutyl ether.

References Cited by the Examiner

UNITED STATES PATENTS

| | | | |
|---|---|---|---|
| 2,948,707 | 8/1960 | Benning | 260—2.5 |
| 2,978,414 | 4/1961 | Harz et al. | |
| 2,989,415 | 6/1961 | Horton et al. | |
| 3,001,891 | 9/1961 | Stoller. | |
| 3,049,442 | 8/1962 | Haines et al. | |
| 3,149,995 | 9/1964 | Bauer | 117—138.8 |

OTHER REFERENCES

Dombrow: Polyurethanes, page 134, Reinhold, New York, 1957.

WILLIAM D. MARTIN, *Primary Examiner.*

RICHARD D. NEVIUS, MURRAY KATZ, *Examiners.*